United States Patent [19]
Chun

[11] Patent Number: 5,971,127
[45] Date of Patent: Oct. 26, 1999

[54] CONTROL MECHANISM FOR MOVING A DRIVING SHAFT OF A MACHINE

[76] Inventor: Lin Bin Chun, 17, Ching Wu East Rd., Taichung, Taiwan

[21] Appl. No.: 09/052,960

[22] Filed: Apr. 1, 1998

[51] Int. Cl.[6] .................................................. F16D 11/06
[52] U.S. Cl. ........................ 192/71; 192/93 C; 192/101
[58] Field of Search ................... 192/71, 99 B, 192/75, 93 C, 101

[56] References Cited

U.S. PATENT DOCUMENTS

| | | | |
|---|---|---|---|
| 1,153,853 | 9/1915 | Pfeiffer | 192/75 |
| 1,338,752 | 5/1920 | Sosa | 192/71 X |
| 1,642,107 | 9/1927 | Gaylord | 192/71 |
| 2,722,578 | 12/1955 | Kling | 192/71 X |

*Primary Examiner*—Allan D. Herrmann
*Attorney, Agent, or Firm*—Rosenberg Klein & Bilker

[57] ABSTRACT

A control mechanism for controlling axial movement of a driving shaft of a machine such as a drilling machine. The control mechanism consists of a clutch cooperating with a sleeve member which is operated by two pivotal handles such that when pivoted the driving shaft is lowered and is stopped when the handles are returned.

7 Claims, 6 Drawing Sheets

CONTROL MECHANISM FOR MOVING A DRIVING SHAFT OF A MACHINE

BACKGROUND OF THE INVENTION

1. Field of the Invention

The present invention relates-to a control mechanism for controlling an axial movement of a driving shaft of a machine such as a drilling machine. The control mechanism comprises a clutch means cooperated with a sleeve member which is operated by two pivotal handles such that when pivoting the handles the driving shaft is lowered and is stopped when returning the handles.

2. Brief Description of the Prior Art

Conventional drilling machines for example, which has a driving shaft driven by a motor, a drill bit or a suitable knife member is fixedly connected to the driving shaft so as to machine a workpiece. A movement of the driving shaft is generally controlled by two ways, one of which comprises at least two limit switches disposed to an inner periphery defining a passage through which the driving shaft rotatably extends so as to cut off the motor to set an uppermost and a lowermost position of the driving shaft. The other way comprises an electronic control means which utilizes circuits and electronic members to send signals to relative parts of the machine so as to achieve purposes of controlling the movement of the driving shaft. However, both of the two ways cannot avoid inertia force of the driving shaft even if the motor is stop. This situation makes the driving shaft further move beyond a desired position so that the workpiece could be damaged. In addition, the electronic members has a limited life term so that the whole mechanism could run out of control if a main or important member suddenly does not work as desired.

The present invention provides an improved control mechanism for controlling a driving shaft to mitigate the problems as mentioned above.

SUMMARY OF THE INVENTION

In one aspect of the present invention, there is provided a control mechanism for controlling a driving shaft which is connected to an actuating shaft of the control mechanism which comprises a ring member fixedly mounted to the actuating shaft and a gear freely mounted to the ring member which has at least one pawl member biasedly disposed to a side thereof. The gear is engaged with a power transmitting shaft and has a first toothed portion defined in an inner periphery thereof.

A first tube is mounted to the actuating shaft and fixedly connected to the ring member, and has a first threaded portion defined in an outer periphery thereof. A second tube is irrotatably and slidably mounted to the actuating shaft and has a second threaded portion defined in an inner periphery thereof so as to be engaged with the first threaded portion of the first tube.

A slide member is slidably mounted to the actuating shaft and has a first end with at least two notches defined in an outer periphery thereof and a second end having a tapered edge.

Two handles each have a hook portion engaged with the notch corresponding thereto.

A cap is fixedly connected to the actuating shaft and has two cutaways defined therein. Each the handle is pivotally connected in the cutaway corresponding thereto so that when pivoting the two handles, the slide member is moved along the actuating shaft and the pawl member is pushed radially and outwardly corresponding to an axis of the actuating shaft by the tapered edge and is engaged with the first toothed portion.

It is an object of the present invention to provide a control mechanism having two pivoting handles which is pivoted to actuate a clutch means to controlling a lowering movement of a driving shaft of a machine.

How these and other objects are accomplished will become apparent from the following descriptions and from the drawings.

DETAILED DESCRIPTION OF THE PREFERRED EMBODIMENT

Figure 1:
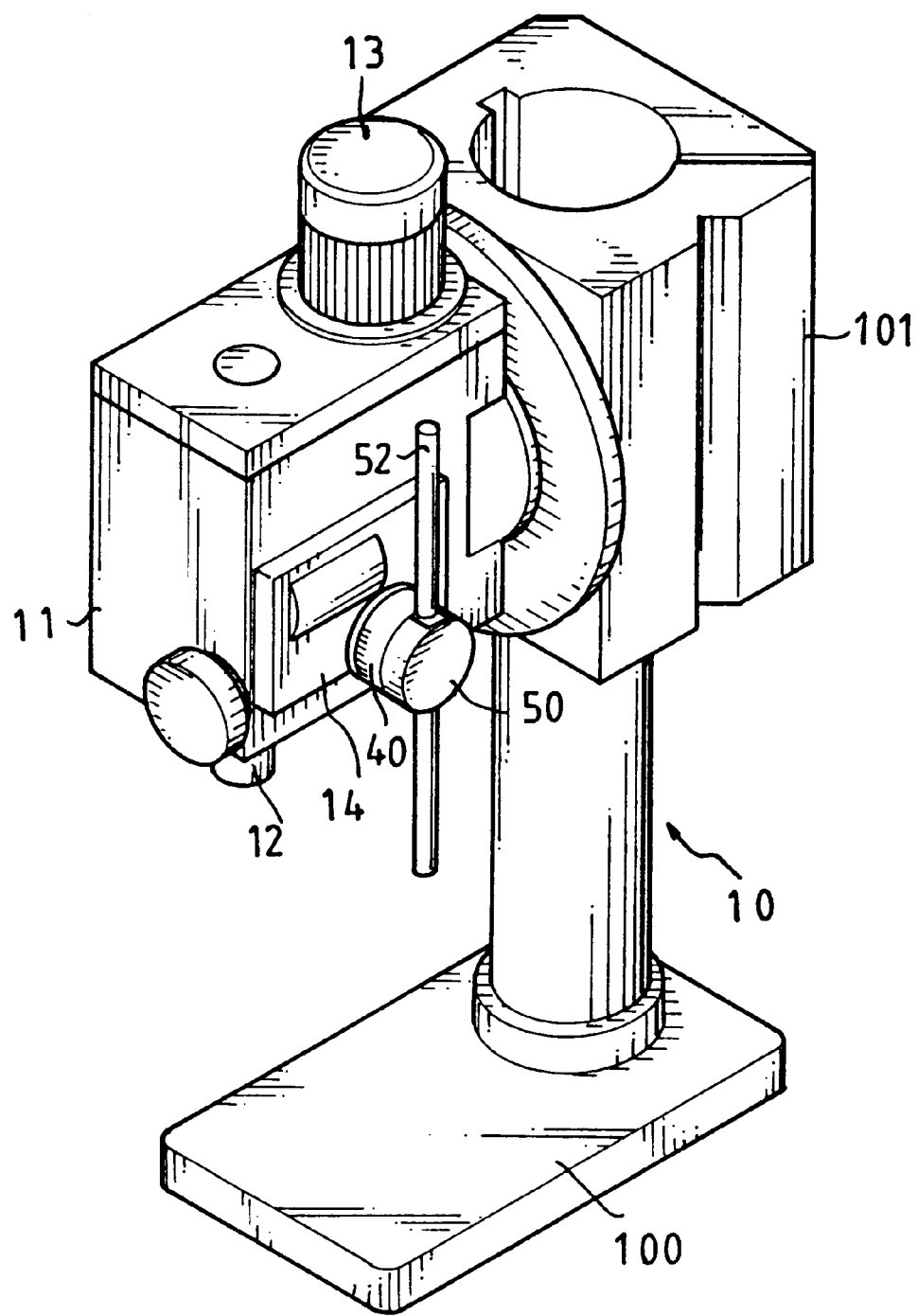
FIG. 1 is a perspective view of a drill machine having a control mechanism in accordance with the present invention disposed thereto.
Figure 2:
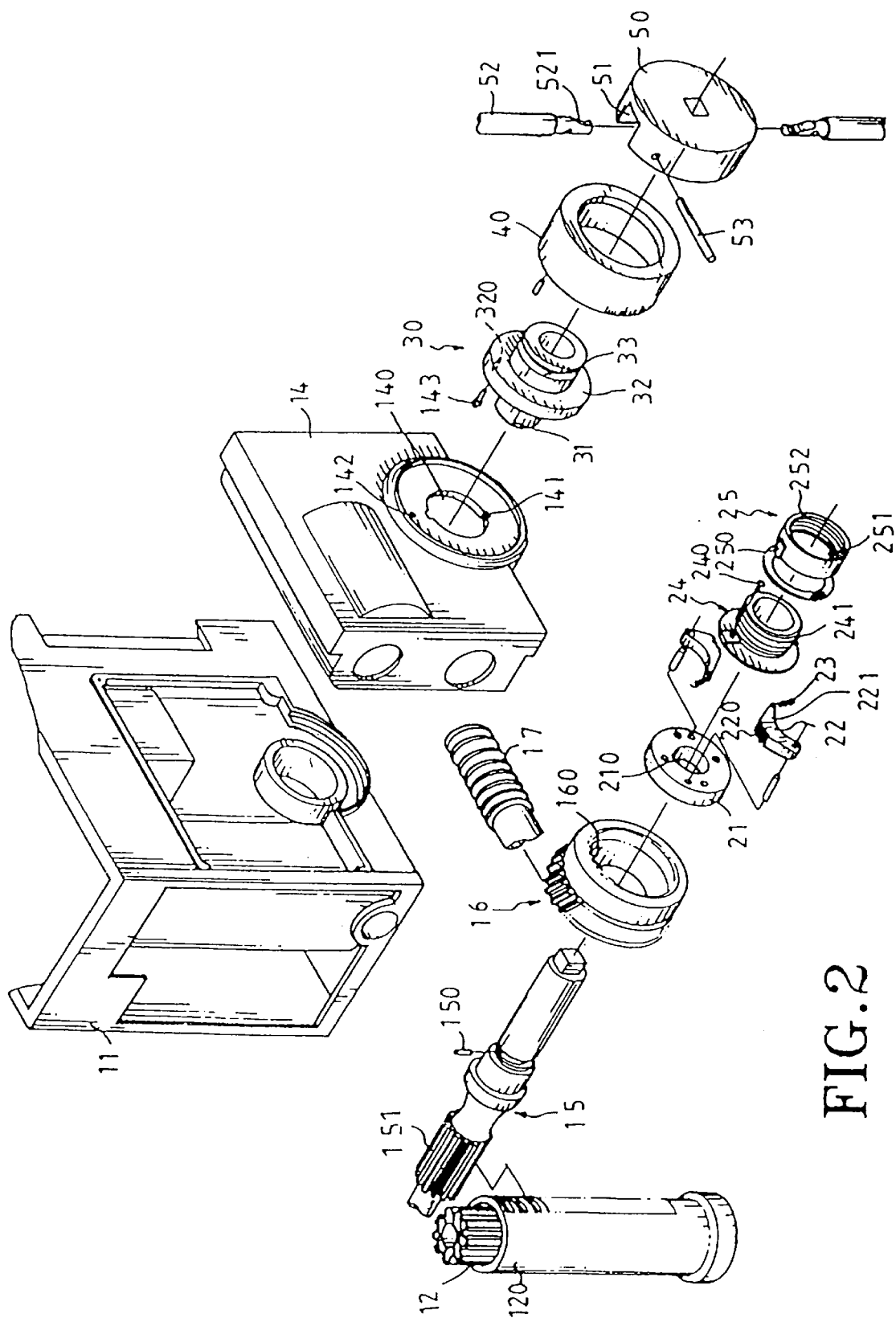
FIG. 2 is an exploded view of the control mechanism in accordance with the present invention.
Figure 3:
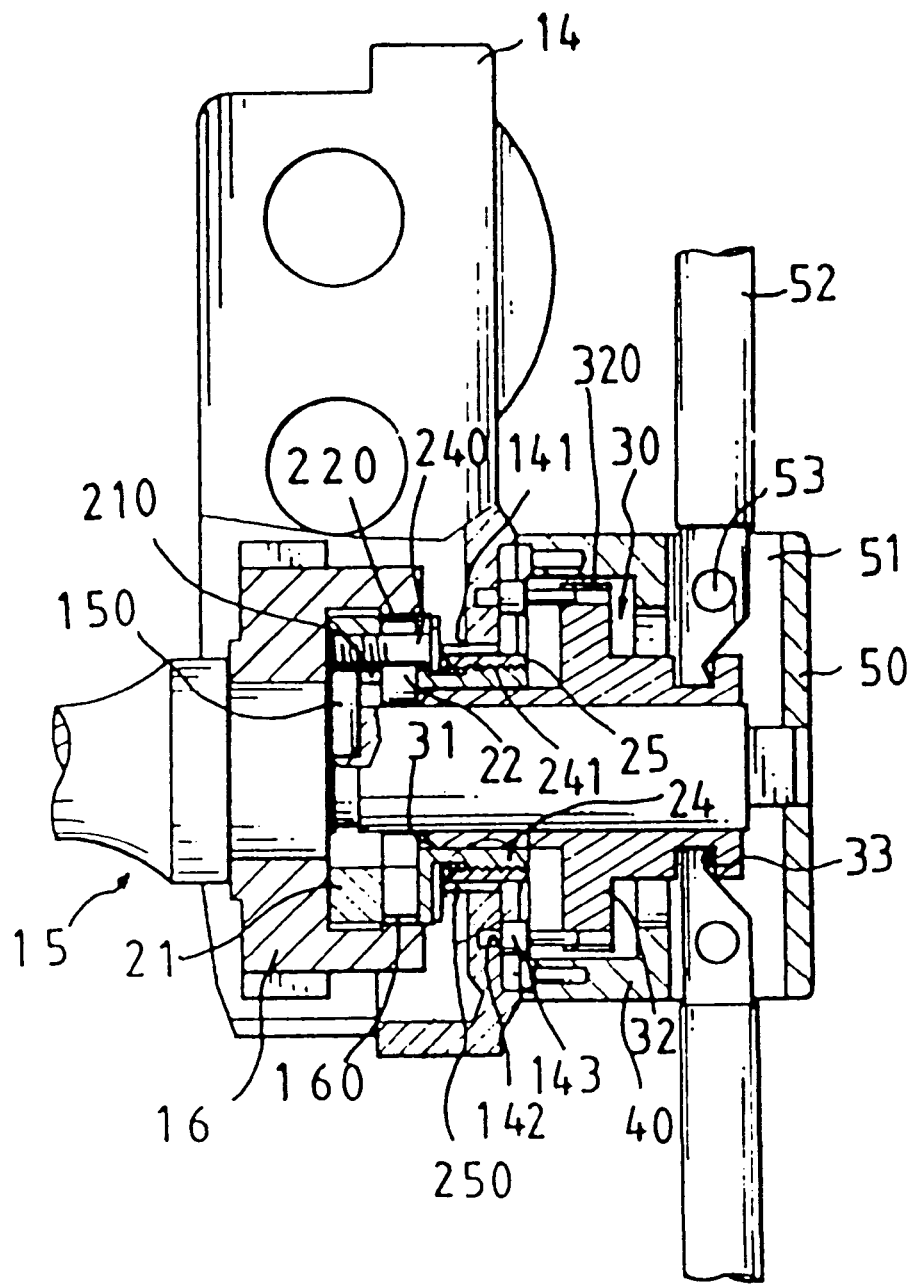
FIG. 3 is a side elevational view, partly in section, of the control mechanism when the two handles are not pivoted.

Referring to the drawings and initially to FIGS. 1 through 3, a drill machine generally comprises a base 100 from which a post 10 extending vertically therefrom, a connecting body 101 slidably mounted to the post 10 and having a gear box 11 connected thereto. A motor 13 is disposed to an upper surface of the gear box 11 and a driving shaft 12 extends from an underside of the gear box 11. The driving shaft 12 has a sleeve 120 mounted thereto and the sleeve has a toothed outer periphery. An auxiliary box 14 is disposed to a side of the gear box 11 and has a collar member 40 together with a cap 50 extending therefrom. Two handles 52 are pivotally connected to the cap 50.

A control mechanism for controlling the driving shaft 12 is disposed in the gear box 12 and comprises an actuating shaft 15 having a toothed end 151 which is engaged with the toothed outer periphery of the sleeve 120 and a distal end which is fixedly connected to the cap 50.

A ring member 21 is fixedly mounted to the actuating shaft 15 and a gear 16 is freely mounted to the ring member 21 which has two pawl members 22 biasedly disposed to a side thereof. The ring member 21 has a dent 210 defined in an inner periphery thereof and a connecting pin 150 extends radially and outwardly from the actuating shaft 15 so that the connecting pin 50 is securely received in the dent 210. The gear 16 is engaged with a power transmitting shaft 17 transmitting a dynamic power of the machine, and has a first toothed portion 160 defined in an inner periphery thereof. Each the pawl member 22 having a toothed upper surface 220 and a curved lower periphery 221 has a first end thereof pivotally connected to the ring member 21 and a second end thereof connected with a first end of a spring 23. The spring 23 has a second end thereof connected to the ring member 21 so as to normally maintain the pawl member 22 in a disengaged position with the first toothed portion 160 of the gear 16.

A first tube 24 is mounted to the actuating shaft 15 and fixedly connected to the ring member 21 by a bolt 240 and has a first threaded portion 241 defined in an outer periphery thereof. A second tube 25 is irrotatably and slidably mounted to the actuating shaft 15 and has a second threaded portion 251 defined in an inner periphery thereof so as to be engaged with the first threaded portion 241 of the first tube 24.

A slide member 30 slidably mounted to the actuating shaft 15 and has a first end with at least two notches 33 defined in an outer periphery thereof and a second end having a tapered edge 31.

The auxiliary box 14 has a hole 140 defined therethrough for the actuating shaft 15 to extend therethrough. At least one recess 141 is defined in an inner periphery defining the hole 140 and the second tube 25 has at least one ridge 250 extending radially and outwardly therefrom so as to be slidably received in the recess 141.

The cap 50 fixedly connected to the actuating shaft 15 has two cutaways 51 defined therein and the two handles 52 each have a hook portion 521 engaged with the notch 33 corresponding thereto. Each the handle 52 is pivotally connected in the cutaway 51 corresponding thereto by a pin 53 so that when pivoting the two handles 52, the slide member 30 is moved along the actuating shaft 15.

The slide member 30 has a flange 32 extending radially and outwardly therefrom which has a passage 320 defined therethrough. A pin 143 has one end thereof fixedly received in an aperture 142 defined in the auxiliary box 14 and extends through the passage 320 so that the slide member 30 is slidable along the pin 143.

Figure 4:
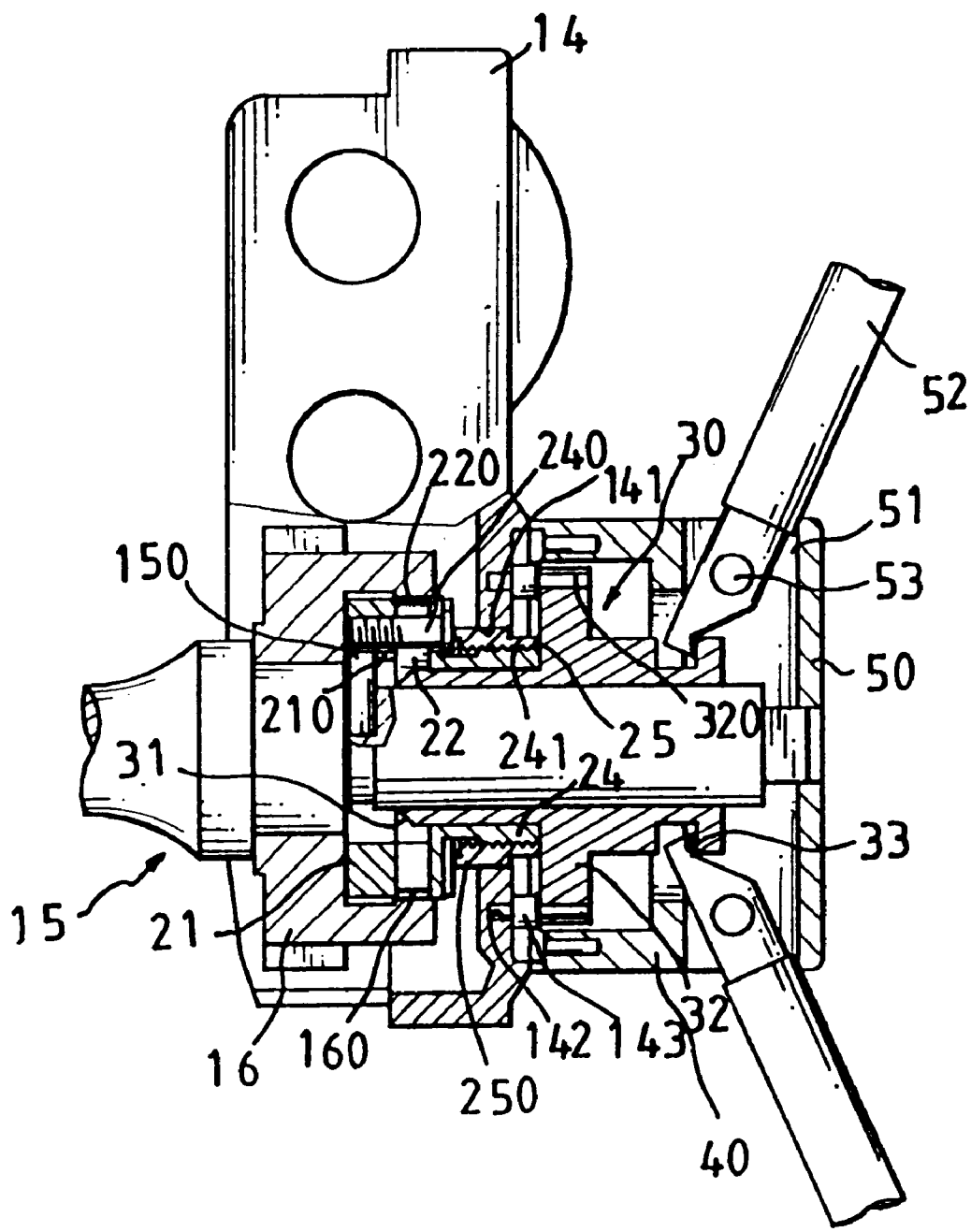
FIG. 4 is a side elevational view, partly in section, of the control mechanism when the two handles are pivoted and the actuating shaft is rotated thereby.
Figure 5:
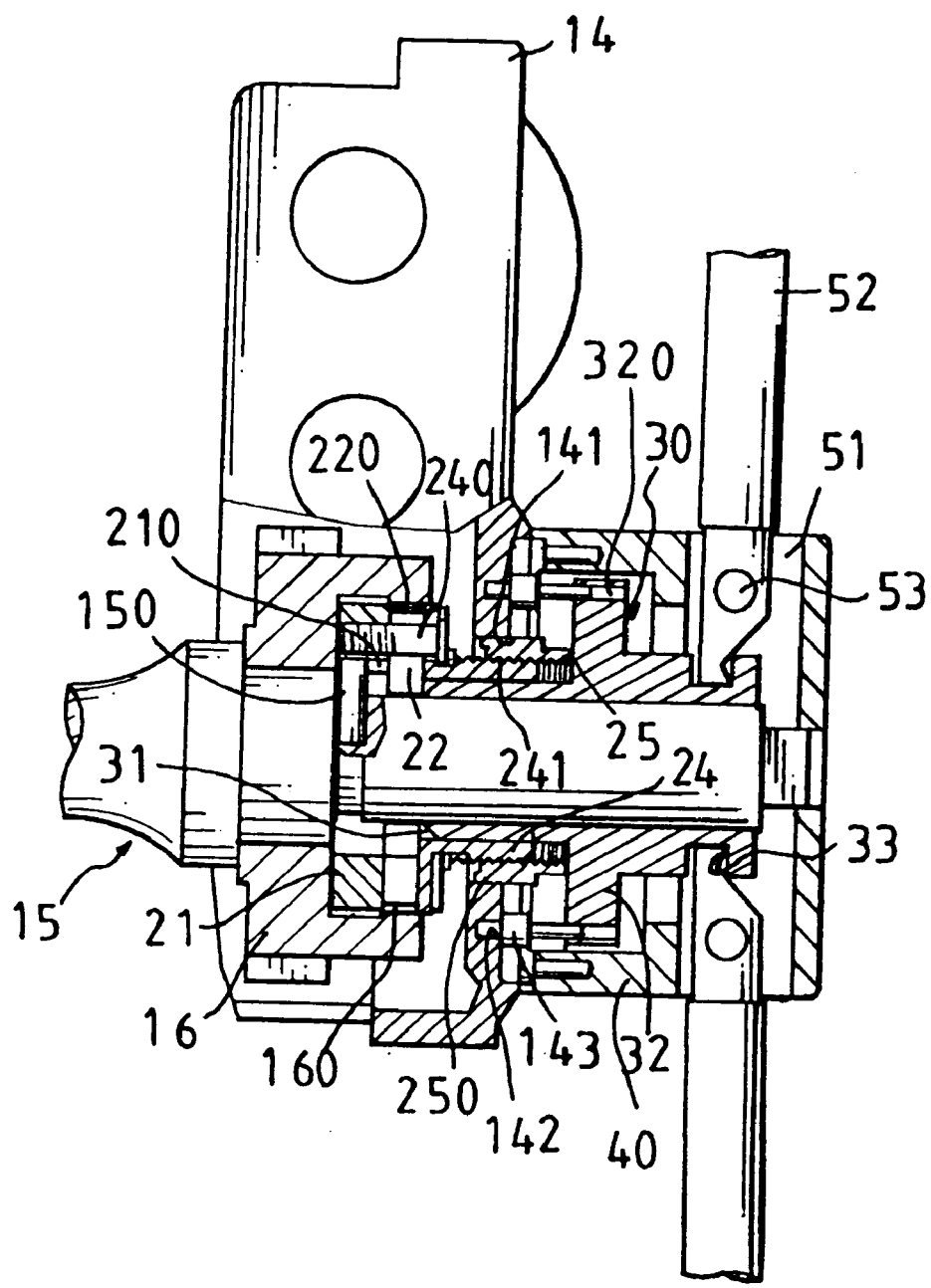
FIG. 5 is a side elevational view, partly in section, of the control mechanism when the driving shaft is automatically raised and the two handles are returned to their original positions by the control mechanism.

It is noted that when the pawl members 22 are not engaged with the first toothed portion 160 of the gear 16, the power transmitted from the power transmitting shaft 17 can only rotate the gear 16 while the actuating shaft 15 is maintained still. Referring to FIG. 4, when pivoting the two handles 52 toward the gear box 11, the pawl members 22 are pushed radially and outwardly corresponding to an axis of the actuating shaft 15 by the tapered edge 31 and engaged with the first toothed portion 160 of the gear 16. Therefore, the ring member 21 is co-rotated with the gear 16 and the actuated shaft 15 is rotated to lower the driving shaft 12. When the driving shaft 12 is lowered to a desired position, a known return means will raise the driving shaft 12 together with the sleeve 120 upwardly, this action makes the actuating shaft 15 rotate in a reverse direction such that the ring member 21 together with the first tube 24 will be rotated and the second tube 25 are actuated to be moved toward the slide member 30 as shown in FIG. 5. Accordingly, a distal end of the second tube 25 will push the slide member 30 away from the ring member 21 such that the two pawl members 22 are disengaged with the tapered edge 31 of the slide member 30 and in turn disengaged from the first toothed portion 160 of the gear 16.

Figure 6:
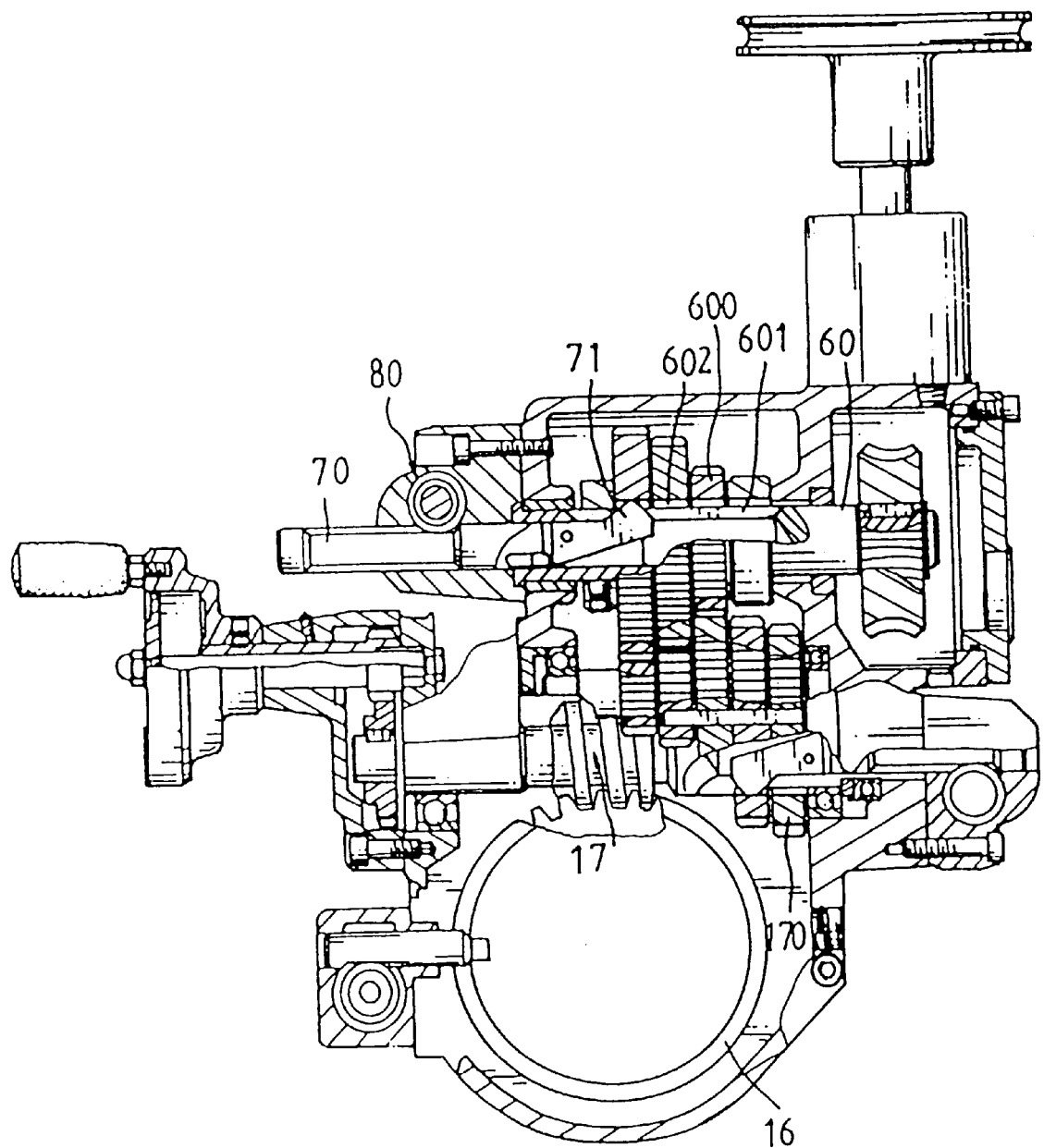
FIG. 6 is a side elevational view, partly in section, of an embodiment of a power transmitting system of the machine together with the control mechanism of the present invention.

Referring to FIG. 6, a power transmitting system is disposed in the gear box 11 and comprising five first gears 170 fixedly mounted to the power transmitting shaft 17 and three second gears 600 freely mounted to a shaft 60 which is located in parallel to the power transmitting shaft 17. The second gears 600 are engaged with the first gears 170 and each of the second gears 600 has a slot 602 defined in an inner periphery thereof. The shaft 60 has a space defined therein and at least one slot 601 defined through a peripheral wall thereof. An operating rod 70 is slidably received in the space of the shaft 60, wherein a first end of the operating rod 70 is connected to a control means 80 which moves the operating rod 70 in the space, and a second end of the operating rod 70 has a plate 71 pivotally connected thereto. The plate 71 has one of two ends thereof optionally received in one of the slots 602 of the second gears 600. Therefore, the shaft 60 is rotated by engagement between the plate 71, one of the second gear 600 and the first gear 170 engaged with the second gear 600. The speed rate of the shaft 60 can be decided by moving the plate 71 to engage with different second gears 600. The shaft 60 is then connected to the motor 13.

While particular embodiments of the present invention have been illustrated and described herein, it is not intended to limit the invention and changes and modifications may be made therein within the scope of the invention as hereinafter claimed.

What is claimed is:

1. A control mechanism for controlling a driving shaft which has a sleeve mounted thereto and said sleeve having a toothed outer periphery, said control mechanism comprising:

an actuating shaft having a toothed end adapted to be engaged with said toothed outer periphery of said sleeve;

a ring member fixedly mounted to said actuating shaft and a gear freely mounted to said ring member which has at least one pawl member biasedly disposed to a side thereof, said gear adapted to be engaged with a power transmitting shaft and having a first toothed portion defined in an inner periphery thereof;

a first tube mounted to said actuating shaft and fixedly connected to said ring member, and having a first threaded portion defined in an outer periphery thereof, a second tube irrotatably and slidably mounted to said actuating shaft and having a second threaded portion defined in an inner periphery thereof so as to be engaged with said first threaded portion of said first tube;

a slide member slidably mounted to said actuating shaft and having a first end with at least two notches defined in an outer periphery thereof and a second end having a tapered edge;

two handles each having a hook portion engaged with said notch corresponding thereto, and a cap fixedly connected to said actuating shaft and having two cutaways defined therein, each said handle being pivotally connected in said cutaway corresponding thereto so that when pivoting said two handles, said slide member is moved along said actuating shaft and said pawl member is pushed radially and outwardly corresponding to an axis of said actuating shaft by said tapered edge and engaged with said first toothed portion.

2. The control mechanism as claimed in claim 1 further comprising a box which has a hole defined therethrough for said actuating shaft extending therethrough, at least one recess defined in an inner periphery defining said hole, said second tube having at least one ridge extending radially and outwardly therefrom so as to be slidably received in said recess.

3. The control mechanism as claimed in claim 1 wherein said pawl member has a curved lower periphery so as to be engaged with said slide member.

4. The control mechanism as claimed in claim 1 wherein said pawl member has a first end thereof pivotally connected to said ring member and a second end thereof connected with a first end of a spring, said spring having a second end thereof connected to said ring member so as to normally maintain said pawl member in a disengaged position with said first toothed portion of said gear.

5. The control mechanism as claimed in claim 1 wherein said slide member has a flange extending radially and outwardly therefrom so that said slide member is pushed by a distal edge of said second tube.

6. The control mechanism as claimed in claims 5 and 2 wherein said flange of said slide member has a passage defined therethrough and a pin extends from said box and through said passage so that said slide member is slidable along said pin.

7. The control mechanism as claimed in claim 1 wherein said ring member has a dent defined in an inner periphery thereof and a connecting pin extends radially and outwardly from said actuating shaft so that said connecting pin is securely received in said dent.

* * * * *